United States Patent
Roussey

(10) Patent No.: US 11,623,737 B2
(45) Date of Patent: Apr. 11, 2023

(54) DEVICE FOR GENERATING A FORCE-SENSATION BY FRICTION FOR AN AIRCRAFT FLIGHT CONTROL SYSTEM

(71) Applicant: Lord Solutions France, Pont de l'Isere (FR)

(72) Inventor: Bastien Roussey, Tain l'hermitage (FR)

(73) Assignee: Lord Solutions France, Pont de l'Isere (FR)

( * ) Notice: Subject to any disclaimer, the term of this patent is extended or adjusted under 35 U.S.C. 154(b) by 1163 days.

(21) Appl. No.: 16/154,962

(22) Filed: Oct. 9, 2018

(65) Prior Publication Data
US 2019/0106199 A1    Apr. 11, 2019

(30) Foreign Application Priority Data

Oct. 9, 2017    (FR) ...................................... 1759423

(51) Int. Cl.
| | |
|---|---|
| *B64C 13/04* | (2006.01) |
| *B64C 13/28* | (2006.01) |
| *G05G 5/03* | (2008.04) |
| *B64C 27/56* | (2006.01) |
| *G05G 1/04* | (2006.01) |
| *B64D 31/04* | (2006.01) |
| *B63H 21/21* | (2006.01) |

(52) U.S. Cl.
CPC .......... *B64C 13/0423* (2018.01); *B64C 13/28* (2013.01); *B64C 27/56* (2013.01); *B64D 31/04* (2013.01); *G05G 1/04* (2013.01); *G05G 5/03* (2013.01); *B63H 21/213* (2013.01); *B64C 13/04* (2013.01)

(58) Field of Classification Search
CPC ............................ B64C 13/0423; B64C 27/56
See application file for complete search history.

(56) References Cited

U.S. PATENT DOCUMENTS

| | | | | |
|---|---|---|---|---|
| 3,601,733 | A  * | 8/1971 | Kazmarek | ........... B64C 13/0423 |
| | | | | 244/220 |
| 4,018,104 | A  * | 4/1977 | Bland | ...................... G05G 5/22 |
| | | | | 74/513 |
| 2011/0162478 | A1* | 7/2011 | Suzuki | ..................... G05G 1/04 |
| | | | | 74/504 |

\* cited by examiner

*Primary Examiner* — Vicky A Johnson
(74) *Attorney, Agent, or Firm* — McAfee & Taft

(57) ABSTRACT

Disclosed is a force sensation generation device comprising a frame (10), suitable for attachment to a frame (2) of an aircraft. The device is configured to be joined to an aircraft control mechanism and to provide frictional resistance to the movement of the aircraft control mechanism. The device includes two frictional interfaces defined by two rotatable and two fixed surfaces. Application of sufficient force to the device will overcome the frictional forces at the frictional interfaces.

62 Claims, 5 Drawing Sheets

DEVICE FOR GENERATING A FORCE-SENSATION BY FRICTION FOR AN AIRCRAFT FLIGHT CONTROL SYSTEM

PRIORITY CLAIM

This application claims the priority of and incorporates by reference French Patent Application No. 175942, filed Oct. 9, 2017, entitled: SPHERICAL CONTACT FRICTION DEVICE.

TECHNICAL FIELD

The present disclosure describes a device for an aircraft flight control system capable of generating a force-sensation by frictional resistance. This disclosure also describes an aircraft flight control system comprising such a device.

BACKGROUND

One familiar with modern aircraft understands the conventional use of aircraft control mechanisms such as, throttle and mixture controls as well as rudder pedals and control wheels for managing flight operations. Additionally, those familiar with modern aircraft also understand the use of frictional controls to assist in retaining the control mechanisms in a desired position.

Frictional controls typically utilize two friction surfaces in contact with one another which when under a given force resists movement. In practice, a single pair of two such friction surfaces can be provided, or a plurality of pairs of two such friction surfaces. Generally, friction surfaces that are flat or cylindrical are used to resist sliding force. In existing devices, the average pressure exerted near the friction surfaces is much higher than what is calculated theoretically. The poor knowledge of the contact interface between the friction surfaces, as well as the variability of that interface resulting from geometric tolerances associated with each part of the device, results in inconsistent application of pressure at the contact interface. The lack of consistent pressure produces increased wear and risk of failure.

SUMMARY

In one embodiment the present disclosure provides a force sensation generation device. The device comprises a frame having two passageways there through. The first passageway extends from a first opening in a first side to a second opening in a second side and the second passageway extends from a third opening in a third side to a fourth opening in a fourth side. Positioned in the first opening is a first friction ring. The friction ring has a first friction surface facing outwardly from the frame. Positioned in the second opening is a second friction ring. The second friction ring has a second friction surface facing outwardly from the frame. Passing through the first passageway is a shaft. The shaft comprises a first end, a second end, a central portion located between the first end and the second end. Additionally, a borehole passes through the central portion of the shaft. The central portion of the shaft is positioned within the first passageway of the frame. The shaft carries a collar at the first end of the shaft. The collar has a first side and a second side with the second side of the collar defining a third friction surface. Secured to the central portion of the shaft is a lever. The lever has a first end and a second end. The second end of the lever has a threaded opening. With the device in the assembled configuration, the second end of the lever passes through the third opening of the frame where it is secured to the central portion of the shaft. A threaded device passing through the fourth opening of the frame and the borehole of the central portion of the shaft is received in the threaded opening of the lever to retain the lever to the central portion of the shaft. The second end of the shaft carries a pre-loading device. The preloading device comprises a pad having a first side and a second side. The first side of the pad defines a fourth friction surface. With the device in the assembled configuration, the pre-loading device forces the first friction surface against the third friction surface and the second friction surface against the fourth friction surface.

In another embodiment the present disclosure provides a force sensation generation device. The device comprises a frame having two passageways there through. The first passageway extends from a first opening in a first side to a second opening in a second side and the second passageway extends from a third opening in a third side to a fourth opening in a fourth side. Positioned in the first opening is a first friction ring. The friction ring has a first friction surface facing outwardly from the frame. Positioned in the second opening is a second friction ring. The second friction ring has a second friction surface facing outwardly from the frame. Passing through the first passageway is a shaft. The shaft comprises a first end, a second end, a central portion located between the first end and the second end. Additionally, a borehole passes through the central portion of the shaft. The central portion of the shaft is positioned within the first passageway of the frame. The shaft carries a collar at the first end of the shaft. The collar has a first side and a second side with the second side of the collar defining a third friction surface. Secured to the central portion of the shaft is a lever. The lever has a first end and a second end. The second end of the lever has a threaded opening. With the device in the assembled configuration, the second end of the lever passes through the third opening of the frame where it is secured to the central portion of the shaft. A threaded device passing through the fourth opening of the frame and the borehole of the central portion of the shaft is received in the threaded opening of the lever to retain the lever to the central portion of the shaft. The second end of the shaft carries a pre-loading device. The preloading device comprises a pad having a first side and a second side. The first side of the pad defines a fourth friction surface. Additionally, the preloading device includes a securing device and a flexible component positioned between the pad and the securing device. With the device in the assembled configuration, the pre-loading device forces the first friction surface against the third friction surface and the second friction surface against the fourth friction surface.

In still another embodiment, the present disclosure provides a force sensation generation device. The device comprises a frame having two passageways there through. The first passageway extends from a first opening in a first side to a second opening in a second side and the second passageway extends from a third opening in a third side to a fourth opening in a fourth side. Positioned in the first opening is a first friction ring. The friction ring has a first friction surface facing outwardly from the frame. The configuration of the first friction surface may be convex, concave or relatively flat. Positioned in the second opening is a second friction ring. The second friction ring has a second friction surface facing outwardly from the frame. The configuration of the second friction surface may be convex, concave or relatively flat. Passing through the first passageway is a shaft. The shaft comprises a first end, a second end, a central portion located between the first end and the second end. Additionally, a borehole passes through the central portion of the shaft. The central portion of the shaft is positioned within the first passageway of the frame. The shaft carries a collar at the first end of the shaft. The collar has a first side and a second side with the second side of the collar defining a third friction surface. In the assembled configuration, the third friction surface engages the first friction surface. If the first friction surface has a relatively flat surface, then the third friction surface has a complementary relatively flat surface. If the first friction surface is concave, then the third friction surface is convex and if the first friction surface is convex then the third friction surface is concave. If the first friction surface is spherical, then the third friction surface is toroidal and if the first friction surface is toroidal then the third friction surface is spherical. Secured to the central portion of the shaft is a lever. The lever has a first end and a second end. The second end of the lever has a threaded opening. With the device in the assembled configuration, the second end of the lever passes through the third opening of the frame where it is secured to the central portion of the shaft. A threaded device passing through the fourth opening of the frame and the borehole of the central portion of the shaft is received in the threaded opening of the lever to retain the lever to the central portion of the shaft. The second end of the shaft carries a pre-loading device. The preloading device comprises a pad having a first side and a second side. The first side of the pad defines a fourth friction surface. In the assembled configuration, the fourth friction surface engages the second friction surface. If the second friction surface has a relatively flat surface, then the fourth friction surface has a complementary relatively flat surface. If the second friction surface is concave, then the fourth friction surface is convex and if the second friction surface is convex then the fourth friction surface is concave. If the second friction surface is spherical, then the fourth friction surface is toroidal and if the second friction surface is toroidal then the fourth friction surface is spherical. Additionally, the preloading device includes a securing device and a flexible component positioned between the pad and the securing device. With the device in the assembled configuration, the pre-loading device forces the first friction surface against the third friction surface and the second friction surface against the fourth friction surface.

In another embodiment, a device configured to create a force sensation in an aircraft flight control system. The device comprises a frame, a first friction ring, a second friction ring, a shaft, a collar, a lever, and a pre-loading device. The frame is configured to be secured to an aircraft mount, the frame having a first passageway extending from a first opening in a first side to a second opening in a second side and a second passageway extending from a third opening in a third side to a fourth opening in a fourth side. The first friction ring has at least a portion of said first friction ring positioned in the first opening, said friction ring having a first friction surface. The second friction ring has at least a portion of said second friction ring positioned in the second opening, said second friction ring having a second friction surface. The shaft is rotatably secured within the frame around an axis of rotation, said shaft comprising a first end, a second end, a central portion located between said first end and said second end, a borehole passing through said central portion of said shaft, said central portion of said shaft positioned within said first passageway of said frame. The collar is carried by said first end of said shaft, said collar having a first side and a second side, said second side of said collar defining a third friction surface. The lever has a first end and a second end, said second end having a threaded opening, said second end of said lever passing through said third opening and secured to said central portion of said shaft by a threaded device passing through said fourth opening and said borehole of said central portion of said shaft, said threaded device received in said threaded opening of said lever. The pre-loading device is carried by said second end of said shaft, said preloading device comprising a pad, said pad having a first side and a second side, said first side of said pad defining a fourth friction surface. In the assembled configuration, said pre-loading device forces said first friction surface against said third friction surface and said second friction surface against said fourth friction surface. The first and second friction surfaces are spherical and the third and fourth friction surfaces are toroidal.

As configured, the friction imparting surfaces can align freely with each other without generating alignment stresses. As a result, the disclosed device does not require guide elements such as bearings. Thus, the disclosed device reduces the number of components and in turn reduces operational weight. As a result, the device increases reliability of the device. Thus, the friction surfaces provide a dual function, namely a friction function and a guide function. For each pair of friction surfaces frictional force results when the convex surface is rotated against the concave surface around an axis. The respective centers of concave surfaces define an axis of rotation for the aforementioned dual function.

In one embodiment, the two first friction-surfaces have a radius or curvature equal to between 1.01 and 1.3 times the small radius of the two second friction-surfaces. The device further comprises a preloading system mounted on the shaft so as to press the first and second friction-surfaces together to generate said friction. The preloading system restrains one of the two friction-surfaces. The other of the two friction-surfaces is defined by a collar integral with or secured to the shaft. The preloading system comprises a support member. During assembly of the device the support member is brought onto the shaft adjustably along the axis of rotation. When in service the support member is rotatably fixed to the shaft along the axis of rotation on the shaft. The device further includes a pad slidably secured to the shaft. The pad carries one of the two convex friction surfaces. Positioned between the pad and the support member is an elastic member that is elastically deformable along the axis of rotation. The elastic member presses the friction-surface defined by the pad against one of the two friction-surfaces securely joined with the frame in service. In one embodiment, the elastic member includes a bellows configuration secured to the pad and the support member. In this embodiment, the two friction-surfaces are fitted on either side of the main body in a manner to preclude rotation around the axis of rotation and preclude axial movement towards each other.

In another embodiment the invention provides a flight control system of an aircraft, comprising a device for generating force-sensation, as defined above, and a lever. One end of the lever is connected to the shaft of the device. The lever provides the ability to rotate the shaft around the axis of rotation to apply friction and generate force-sensation.

BRIEF DESCRIPTION OF THE DRAWINGS

The invention will be better understood from reading the following description, provided solely by way of example and with reference to the drawings in which.

DETAILED DESCRIPTION

Figure 1:
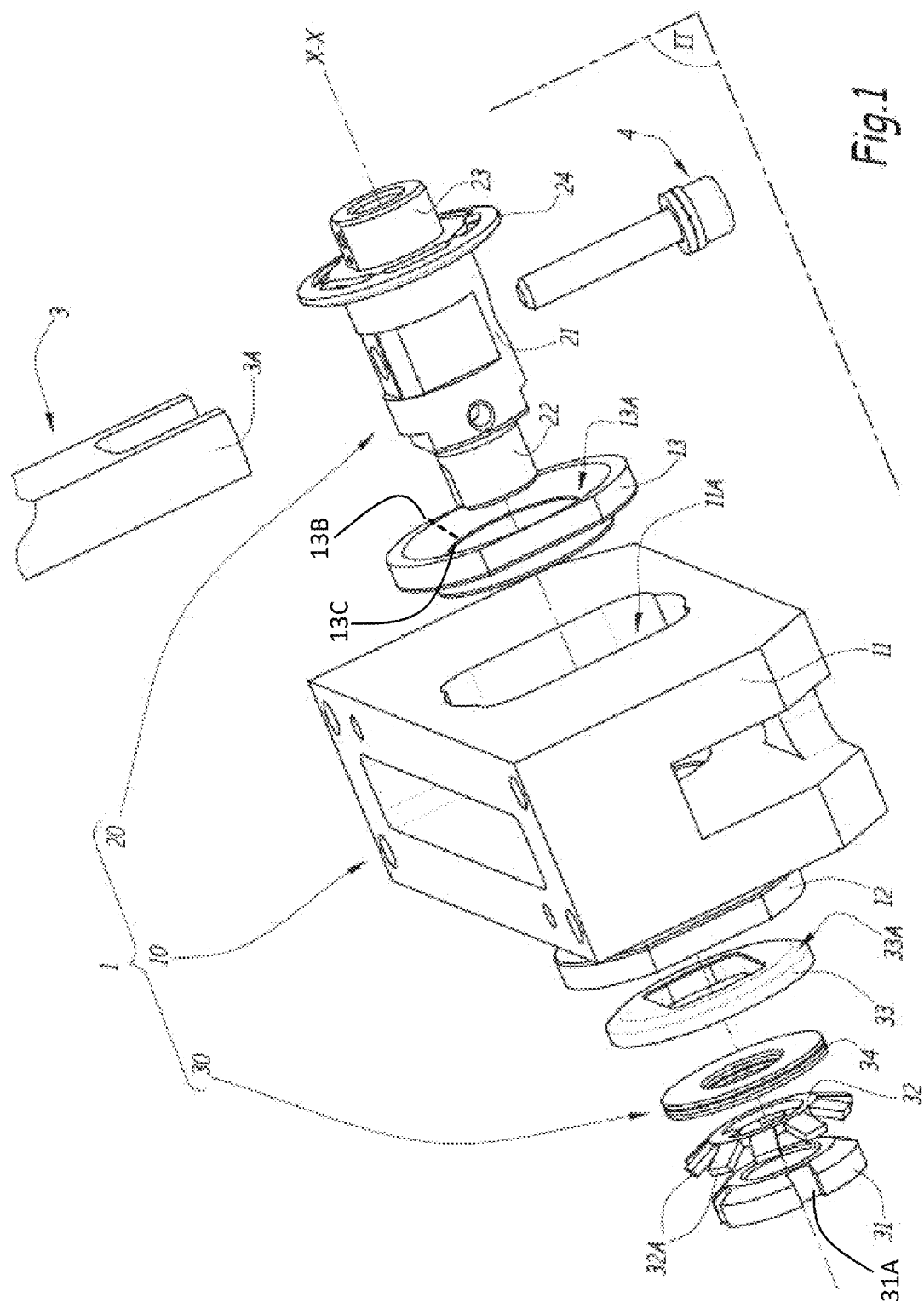
FIG. 1 is an exploded view in perspective of the disclosed device.
Figure 2:
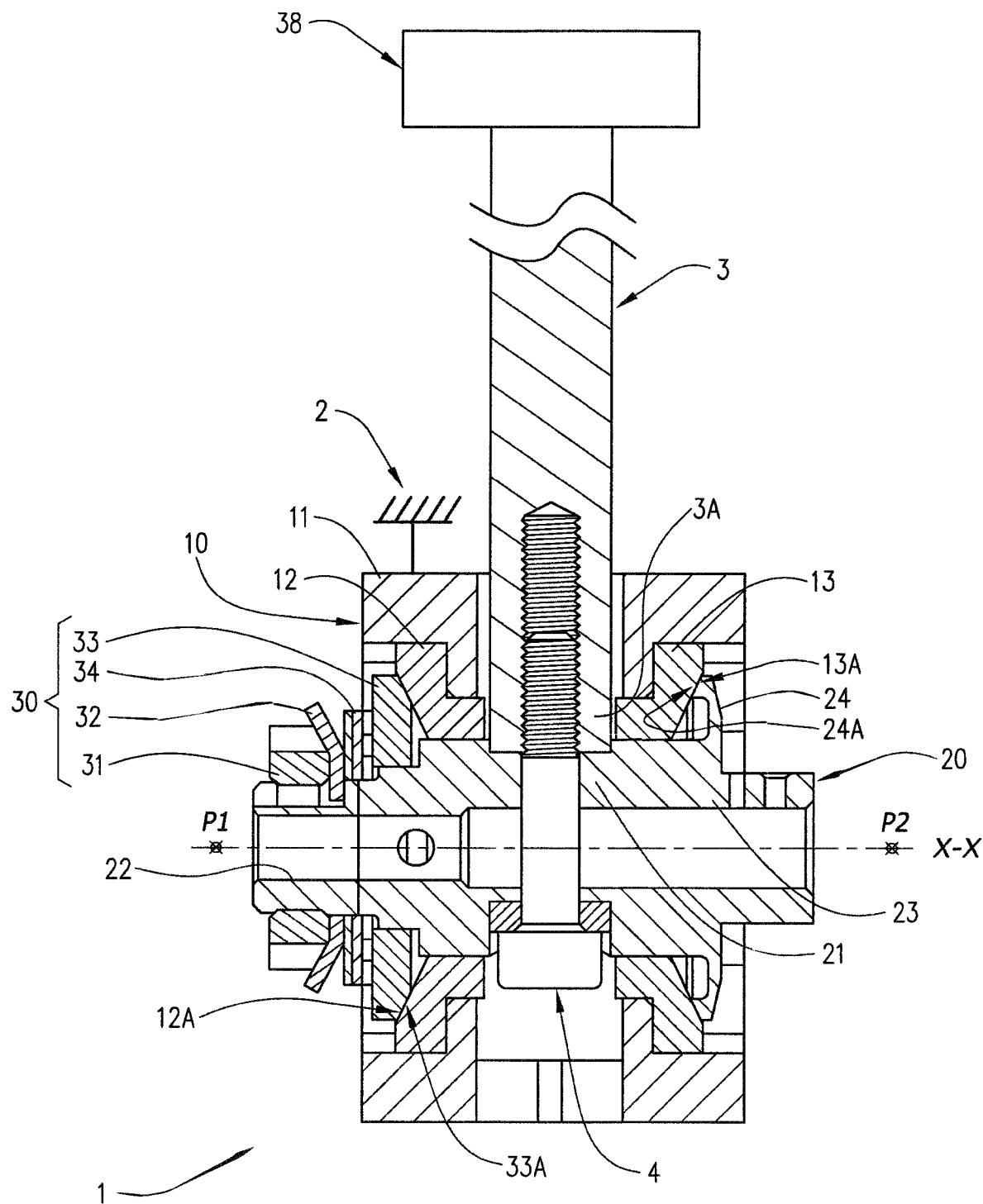
FIG. 2 is a section along plane II of FIG. 1 depicting the device as assembled.

Represented in FIGS. 1 and 2 is a device 1 for generating a force-sensation. In service, device 1 is integrated into a flight control system of an aircraft, i.e. a system for operating a device of the aircraft.

The device 1 comprises a frame 10, a shaft 20 rotatably secured within frame 10 around an axis of rotation X-X, and a pre-loading device 30 mounted on shaft 20. Pre-loading device also engages frame 10.

Frame 10 is configured to be secured to an aircraft mounting 2 as reflected schematically in FIG. 2. Any convenient mounting connection may be used to secure frame 10 to aircraft mounting 2.

In the exemplary embodiment of the FIGS., frame 10 comprises a main body 11 configured to be secured to aircraft mounting 2. Two friction rings 12 and 13 are fitted to main body 11. Shaft 20 extends through bore 11A of main body 11 and through friction rings 12 and 13. Under normal conditions, a slight gap of about 0.1 mm to about 1.0 mm exists between shaft 20 and the inner surface of friction rings 12 and 13. See each point A in FIG. 2. More typically, the gap at point A between friction ring 12 and shaft 20 and friction ring 13 and shaft 20 will be about 0.5 mm. Lateral loading of lever 3 may close this gap leading to direct contact between friction rings 12 and 13 and shaft 20. Bore 11A corresponds to axis X-X. Opposite openings of bore 11A are configured to receive friction ring 12 and friction ring 13 in a manner to preclude rotation of friction ring 12 and friction ring 13 around the axis X-X. Additionally, main body 11 and openings bore 11A cooperate to block axial translation of friction rings 12 and 13 towards each other. Shaft 20 includes an intermediate part 21, a lateral part 22, a lateral part 23 and a collar 24. Collar 24 may be integral with lateral part 23 or a separate component carried by shaft 20. In the assembled configuration, intermediate part 21 passes through friction ring 13 and bore 11A receives intermediate part 21. Lateral part 22 extends beyond main body 11 and passes through friction ring 12. Collar 24 abuts friction ring 13 and lateral part 23 extends outward from collar 24 and friction ring 13. Additionally, collar 24 carries a convex friction surface 24A which faces friction ring 13. As used herein, concave and spherical are sufficiently similar as to be synonymous and convex and toroidal are sufficiently similar as to be synonymous.

Friction ring 12 defines a spherical or concave friction-surface 12A where the center of the spherical arc defined by the concave portion is indicated as point P1. Friction-surface 12A faces away from main body 11. Likewise, friction ring 13 defines a spherical or concave friction-surface 13A where the center of the spherical arc defined by the concave portion is indicated as point P2. See FIG. 4B and FIG. 5. Friction-surface 13A faces away from main body 11. Friction surfaces 12A and 13A are separated from each other by main body 11 and define the axis X-X. Thus, axis X-X passes through spaced apart points P1 and P2.

With device 1 in the assembled configuration, shaft 20 is rotatable around axis X-X. Further, end 3A of a lever 3 is secured to shaft 20 by assembly member 4 passing through intermediate part 21. Lever 3 belongs to the aforementioned flight control system. As depicted in FIG. 2, lever 3 is intended to be actuated at end 3B. In practice, end 3B of the lever 3 can take different embodiments. Specifically, end 3B can be adapted to be mechanically connected with other flight control system components such as a yoke. Alternatively, end 3B may be extended to form a yoke or other hand-actuated device manipulated by the aircraft pilot. The method of securing lever 3 with the shaft 20 depicted in the FIGS. is merely exemplary. While depicted as a mechanical attachment using assembly member 4 passing through intermediate part 21 into end 3A, in an alternative embodiment lever 3 may be integral with shaft 20.

Applying pressure to lever 3 at end 3B produces a torque value centered on axis X-X and results in frictional force due to the configuration of device 1. If the amount of torque applied at end 3b is greater than the frictional resistance imparted by pre-loading device 30 to the components of device 1, then shaft 20 will rotate around axis X-X.

Preloading device 30 comprises a nut 31 carried by shaft 20 at lateral part 22. Thus, nut 31 is centered on axis X-X. Preloading device 30 also includes a washer 32 carried by and typically keyed to lateral part 22. Washer 32 aids in locking nut 31 in a fixed position on lateral part 22 of shaft 20. As depicted in FIG. 1, nut 31 includes notches 31A and washer 32 includes tabs 32A. Folding of at least one-tab 32A into engagement with at least one notch 31 precludes rotation of nut 31 on lateral portion 22 of shaft 20. Thus, washer 32 precludes loss of nut 31 from lateral part 22 and thereby maintains the frictional setting of preloading device 30.

The preloading device 30 further comprises a pad 33. Pad 33 engages shaft 20 such that rotation of shaft 20 results in rotation of pad 33 about axis X-X. Additionally, pad 33 is free to slide axially along shaft 20. As depicted in the FIGS., pad 33 is keyed or matched to a portion of lateral part 22 of shaft 20, i.e. the non-circular opening of pad 33 conforms to the exterior configuration of lateral part 22 such that pad 33 will not rotate on lateral part 22. Accordingly, pad 33 rotates on axis X-X only when torque sufficient to overcome the frictional force of device 1 is applied to arm 3.

The preloading device 30 also comprises an elastic or deformable member 34 positioned between pad 33 and washer 32. In some embodiments, washer 32 may be omitted in which elastic member is positioned between pad 33 and nut 31. Elastic member 34 deforms as a result of tightening of nut 31. Thus, elastic member 34 compresses along axis X-X upon tightening of nut 31. As depicted in the FIGS., elastic member 34 comprises one or more distinct elastic elements stacked between the washer 32 and the pad 33. Thus, tightening of nut 31 forces washer 32 against elastic member 34 which in turn forces pad 33 against friction ring 12.

As depicted in FIG. 1, the face of pad 33 directed towards friction ring 12 defines a convex friction surface 33A. Toroidal or convex friction surface 33A engages spherical or concave friction surface 12A of friction ring 12 as depicted in FIG. 2. Similarly, on the other side of main body 11, spherical or concave friction surface 13A of friction ring 13 engages toroidal or convex friction surface 24A of collar 24. Convex friction surfaces 33A and 24A rotates about axis X-X when sufficient torque is applied to lever 3 to overcome frictional resistance of device 1, i.e. the resistance at the frictional interface between 13A and 24 and the frictional interface between 12A and 33A.

The exploded view of device 1 in FIG. 1 demonstrates the arrangement of components with the assembled components depicted in the cut-away view of FIG. 2. Following assembly of friction rings 12 and 13 and the components associated with shaft 20 to main body 11, pad 33 is placed on shaft 20 followed by optional elastic member 34 and washer 32. Subsequently nut 31 is threaded onto lateral part 22 of shaft 20. Nut 31 is adjusted on lateral part 22 to provide sufficient axial thrust on the rotational components 24 and 33 of device 1 to establish the desired friction at the frictional interface of 12A and 33A and the frictional interface of 13A and 24A. Upon establishment of the desired frictional setting, one or more tabs 32A of washer 32 are pressed into notches 31A of nut 31. As discussed above, positioning of nut 31 on lateral part 22 deforms elastic member 34 resulting in the desired axial force against pad 33 which translates axially to the other components 12, 13 and 24 positioned about shaft 20. Optionally, a second nut 35, may be included as an additional locking mechanism to secure first nut 31 in a fixed position on shaft 21 such that nut 31 does not independently rotate about axis X-X. Thus, nuts 31 and 35 rotate about axis X-X only when shaft 20 rotates about axis X-X.

As discussed above, collar 24 may be integral with lateral part 23, as depicted in the FIGS., or a separate component fitted and secured to shaft 20 or lateral part 23. In either embodiment, convex frictional surface 24A will be present on the side of collar 24 facing friction ring 13 thereby providing the frictional interface between 13A and 24A.

Friction surfaces 24A and 33A typically have a convex configuration corresponding to the concave faces of friction surfaces 12A and 13A. Thus, the configuration of the frictional interfaces provides for self-centering of components of device 1. Additionally, the configuration of components limits movement of shaft 20 to rotation about axis X-X passing through points P1 and P2. The resulting balancing of forces across device 1 reduces wear and seizing of parts thereby reducing overall costs.

Figure 4:
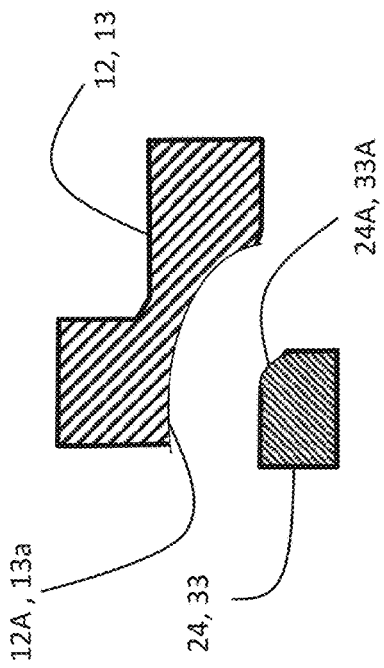
FIGS. 4A-4D depict alternative embodiments for the frictional interfaces.
Figure 4:
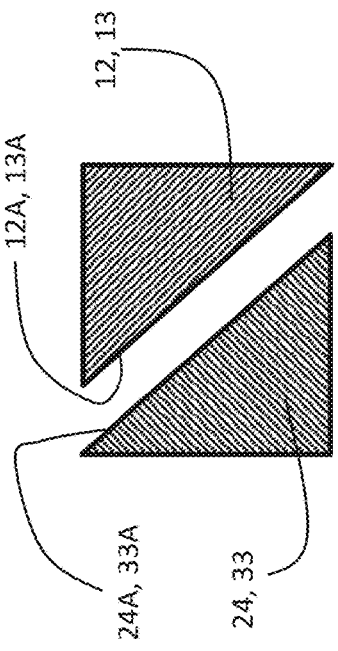
Figure 4:
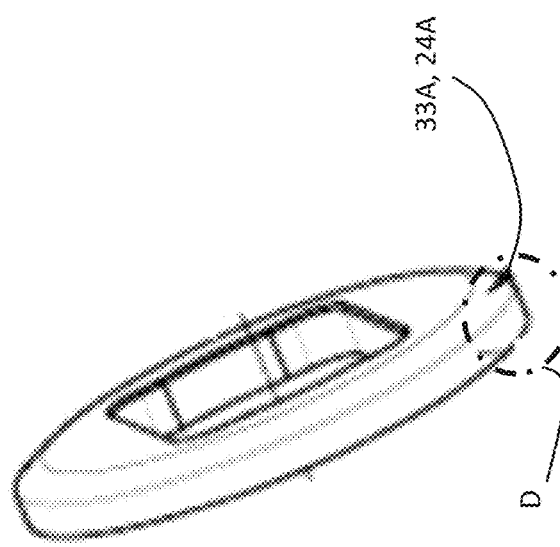
Figure 4:
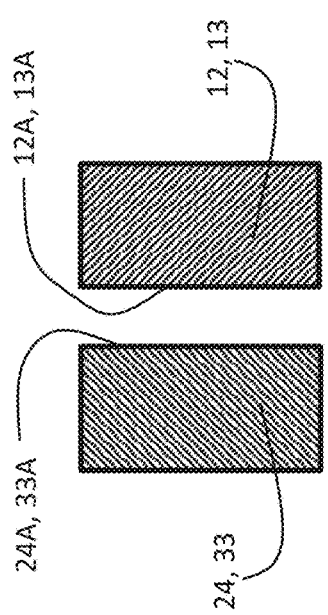
Figure 5:
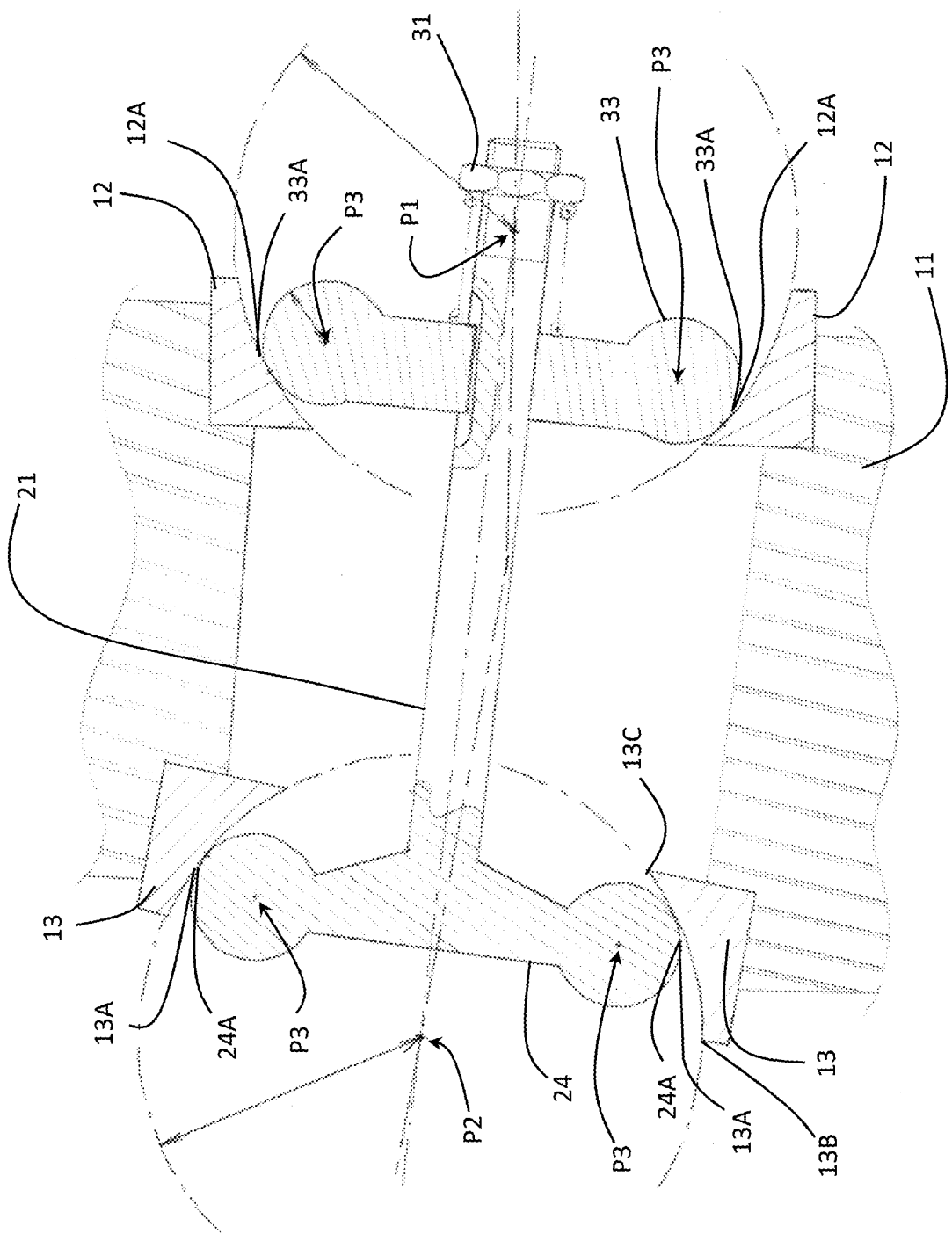
FIG. 5 depicts the relationship of the respective radii of the frictional surfaces and points P1, P2.

In one embodiment, convex friction-surfaces 24A and 33A have a radius which is smaller than the radius of concave friction-surfaces 12A and 13A. With reference to FIGS. 1, 4 and 5, in one embodiment, each friction surface has a spherical convex or concave arc. An exemplary arc is depicted on FIGS. 1 and 5 between 13B and 13C on friction ring 13. Each of friction ring 12, friction ring 13, collar 24 and pad 33 have an arc used to define the relationship between the associated friction surfaces. In one embodiment, the arc component of concave friction-surfaces 12A and 13A has a radius with a value between 1.01 and 1.3 times the arc component of the convex friction-surfaces 24A and 33A. As depicted in FIG. 5, the concave portion of each friction ring 12, 13 have distinct radii separate from the radii of the circular rings. Specifically, the radius of curvature for friction ring 12 is P1 and the radius of curvature of friction ring 13 is P2. Likewise, the convex portion of friction surfaces 24A and 33A have distinct radii beginning at point P3 of collar 24 and pad 33 as indicated in FIG. 5. Thus, in a typical embodiment, the radius of curvature for each concave surface (12A, 13A) is greater than the radius of curvature for the corresponding convex surface (24A, 33A). In this way, the contact stresses, i.e. Hertz pressures, at each of the two frictional interfaces defined by 33A with 12A and 13A with 24A are particularly low.

As depicted in FIGS. 4C and 4D, other configurations of device 1 described above are conceivable. In FIG. 4A, area D is a portion of friction surface 24A, 33A. FIGS. 4B, 4C and 4D depict various embodiments of friction surface 24A, 33A with the corresponding component of friction surface 12A and 13A. As discussed above, surfaces 13A and 24A define a first frictional interface when brought together and surfaces 12A and 33A define a second frictional interface. In one alternative embodiment, friction surfaces 12A and 13A may be convex and friction surfaces 24A and 33A may be concave. In this embodiment, the concave radii will be larger than the convex radii. In addition to convex and concave configurations described above, FIGS. 4C and 4D depict friction surfaces 12A, 13A, 24A and 33A as relatively flat surfaces at angles, when measured from shaft 21, ranging from about 45° to 90° with the primary requirement being that the angle of surface 13A is complementary to the angle of 24A and the angle of 12A is complementary to 33A.

Figure 3:
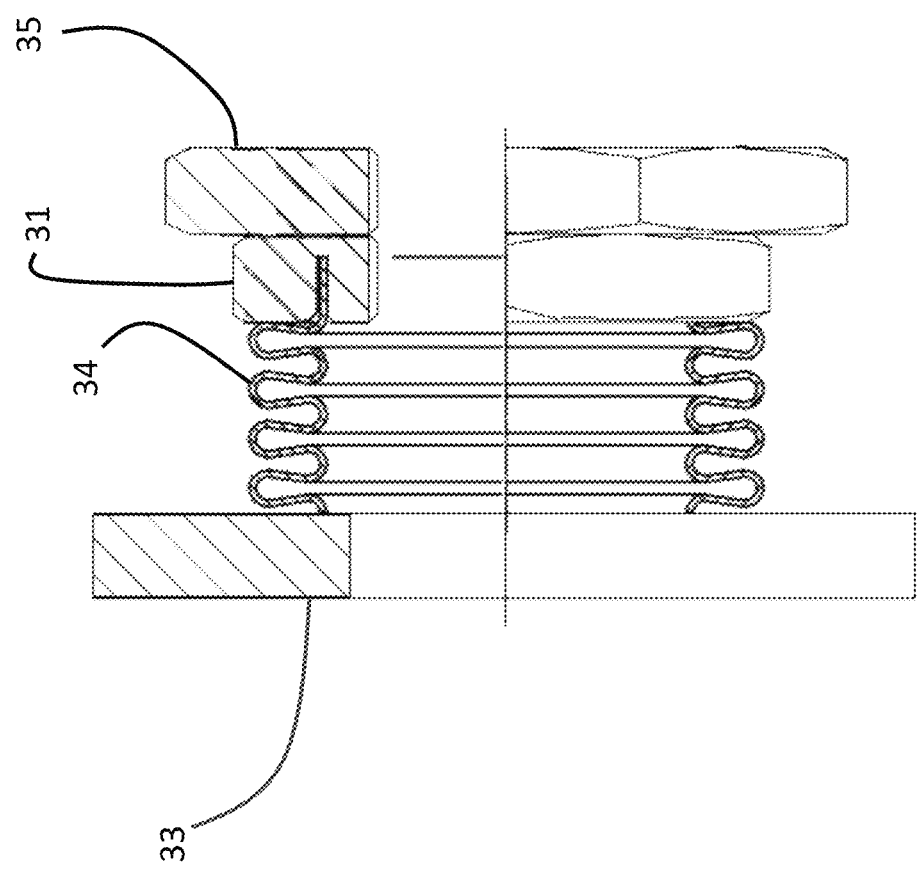
FIG. 3 depicts an alternative embodiment of the locking mechanism used in the disclosed device.

Further, preloading system 30 may utilize fastener configurations other than nut 31 and washer 32. The primary factor for preloading system 30 is the need for the fastener configuration to apply sufficient axial force against the components of device 1 to generate the desired frictional resistance at the frictional interfaces. In particular, an adjustable fastener configuration may be desired. Further, elastic member 34 may be replaced by alternative flexible devices such as an elastic bellows positioned in place of elastic member 34. Further, as an option, elastic bellows may be secured to both pad 33 and washer 32 such that pad 33 rotates about axis X-X only in conjunction with shaft 20. In one embodiment, elastic member 34 may be in the form of metallic bellows as depicted in FIG. 3. As depicted in FIG. 3, second locking nut 35 abuts first nut 31 and elastic member 34 and may be secured to nut 31. The embodiment depicted in FIG. 3 omits washer 32; however, washer 32 may be included in this embodiment and may be positioned between elastic member 34 and nut 31. Thus, in this embodiment, pad 33 would not require keying or matching to shaft 20 or lateral part 22. Such a configuration would preclude binding of pad 33 during placement on shaft 20 or lateral part 22 by improving the angular clearance between components.

Other embodiments of the present invention will be apparent to one skilled in the art. As such, the foregoing description merely enables and describes the general uses and methods of the present invention. Accordingly, the following claims define the true scope of the present invention.

What is claimed is:

1. A device comprising:
    a frame having a first passageway extending from a first opening in a first side to a second opening in a second side and a second passageway extending from a third opening in a third side to a fourth opening in a fourth side;
    a first friction ring, at least a portion of said first friction ring positioned in said first opening, said friction ring having a first friction surface;
    a second friction ring, at least a portion of said second friction ring positioned in said second opening, said second friction ring having a second friction surface;
    a shaft, said shaft comprising:
    a first end;
    a second end;
    a central portion located between said first end and said second end;
    a borehole passing through said central portion of said shaft;
said central portion of said shaft positioned within said first passageway of said frame;

a collar carried by said first end of said shaft, said collar having a first side and a second side, said second side of said collar defining a third friction surface;

a lever, said lever having a first end and a second end, said second end having a threaded opening, said second end of said lever passing through said third opening and secured to said central portion of said shaft by a threaded device passing through said fourth opening and said borehole of said central portion of said shaft, said threaded device received in said threaded opening of said lever;

a pre-loading device carried by said second end of said shaft, said preloading device comprising a pad, said pad having a first side and a second side, said first side of said pad defining a fourth friction surface; and, in the assembled configuration, said pre-loading device forces said first friction surface against said third friction surface and said second friction surface against said fourth friction surface.

2. The device of claim 1, wherein said first friction ring is separated from said shaft by a gap of about 0.1 to about 1.0 mm.

3. The device of claim 1, wherein said second friction ring is separated from said shaft by a gap of about 0.1 to about 1.0 mm.

4. The device of claim 1, wherein said first opening is configured to receive at least a portion said first friction ring in a manner to preclude rotation of said first friction ring and said second opening is configured to receive at least a portion of said second friction ring in a manner to preclude rotation of said second friction ring.

5. The device of claim 1, wherein said collar is integral with said shaft.

6. The device of claim 1, wherein said first passageway has a central axis and said shaft is rotatable about said central axis.

7. The device of claim 1, wherein said first friction surface has a concave configuration, said second friction surface has a concave configuration, said third friction surface has a convex configuration and said fourth friction surface has a convex configuration.

8. The device of claim 7, wherein a radius of an arc defined by said first and second concave friction surfaces is larger than a radius of an arc defined by said third and fourth convex friction surfaces.

9. The device of claim 7, wherein a radius of an arc defined by said first and second concave friction surfaces is between 1.01 and 1.3 times a radius of an arc defined by said third and fourth convex friction surfaces.

10. The device of claim 1, wherein said first friction surface has a convex configuration, said second friction surface has a convex configuration, said third friction surface has a concave configuration and said fourth friction surface has a concave configuration.

11. The device of claim 1, wherein said first friction surface has a relatively flat surface, said second friction surface has a relatively flat surface, said third friction surface has a has a relatively flat surface and said fourth friction surface has a has a relatively flat surface.

12. The device of claim 11, wherein said first friction surface defines an angle between about 45° to about 90° with said shaft and wherein said second friction surface defines an angle between about 45° to about 90° with said shaft.

13. The device of claim 12, wherein said third friction surface defines a complementary angle with said first friction surface and said fourth friction surface defines a complementary angle with said second friction surface.

14. The device of claim 1, wherein said pre-loading device includes an adjustable fastener.

15. A device comprising:
a frame having a first passageway extending from a first opening in a first side to a second opening in a second side and a second passageway extending from a third opening in a third side to a fourth opening in a fourth side;

a first friction ring positioned in said first opening, said friction ring having a first friction surface;

a second friction ring positioned in said second opening, said second friction ring having a second friction surface;

a shaft, said shaft comprising:
a first end;
a second end;
a central portion located between said first end and said second end;
a borehole passing through said central portion of said shaft;

said central portion of shaft positioned within said first passageway of said frame;

a collar carried by said first end of said shaft, said collar having a first side and a second side, said second side of said collar defining a third friction surface;

a lever, said lever having a first end and a second end, said second end having a threaded opening, said second end of said lever passing through said third opening and secured to said central portion of said shaft by a threaded device passing through said fourth opening and said borehole of said central portion of said shaft, said threaded device received in said threaded opening of said lever;

a pre-loading device carried by said second end of said shaft, said preloading device comprising:
a pad, said pad having a first side and a second side, said first side defining a fourth friction surface;
a securing device; and,
a flexible component positioned between said pad and said securing device; and,
in the assembled configuration, said securing device forces said first friction surface against said third friction surface and said second friction surface against said fourth friction surface.

16. The device of claim 15, wherein said first friction ring is separated from said shaft by a gap of about 0.1 to about 1.0 mm.

17. The device of claim 15, wherein said second friction ring is separated from said shaft by a gap of about 0.1 to about 1.0 mm.

18. The device of claim 15, wherein said first opening is configured to receive at least a portion said first friction ring in a manner to preclude rotation of said first friction ring and said second opening is configured to receive at least a portion of said second friction ring in a manner to preclude rotation of said second friction ring.

19. The device of claim 15, wherein said collar is integral with said shaft.

20. The device of claim 15, wherein said first passageway has a central axis and said shaft is rotatable about said central axis.

21. The device of claim 15, wherein said first friction surface has a concave configuration, said second friction surface has a concave configuration, said third friction surface has a convex configuration and said fourth friction surface has a convex configuration.

22. The device of claim 21, wherein a radius of an arc defined by said first and second concave friction surfaces is larger than a radius of an arc defined by said third and fourth convex friction surfaces.

23. The device of claim 21, wherein a radius of an arc defined by said first and second concave friction surfaces is between 1.01 and 1.3 times a radius of an arc defined by said third and fourth convex friction surfaces.

24. The device of claim 15, wherein said first friction surface has a convex configuration, said second friction surface has a convex configuration, said third friction surface has a concave configuration and said fourth friction surface has a concave configuration.

25. The device of claim 15, wherein said first friction surface has a relatively flat surface, said second friction surface has a relatively flat surface, said third friction surface has a has a relatively flat surface and said fourth friction surface has a has a relatively flat surface.

26. The device of claim 25, wherein said first friction surface defines an angle between about 45° to about 90° with said shaft and wherein said second friction surface defines an angle between about 45° to about 90° with said shaft.

27. The device of claim 25, wherein said third friction surface defines a complementary angle with said first friction surface and said fourth friction surface defines a complementary angle with said second friction surface.

28. The device of claim 15, wherein said pre-loading device includes an adjustable fastener.

29. A device comprising:
a frame having a first passageway extending from a first opening in a first side to a second opening in a second side and a second passageway extending from a third opening in a third side to a fourth opening in a fourth side;
a first friction ring positioned in said first opening, said friction ring having a first friction surface said first friction surface having a concave or convex configuration or a relatively flat configuration;
a second friction ring positioned in said second opening, said second friction ring having a second friction surface said second friction surface having a concave or convex configuration or a relatively flat configuration;
a shaft, said shaft comprising:
a first end;
a second end;
a central portion located between said first end and said second end;
a borehole passing through said central portion of said shaft;
said central portion of said shaft positioned within said first passageway of said frame;
a collar carried by said first end of said shaft, said collar having a first side and a second side, said second side of said collar defining a third friction surface said third friction surface having a convex configuration when said first friction surface has a concave configuration and a concave configuration when said first friction surface has a convex configuration;
a lever, said lever having a first end and a second end, said second end having a threaded opening, said second end of said lever passing through said third opening and secured to said central portion of said shaft by a threaded device passing through said fourth opening and said borehole of said central portion of said shaft, said threaded device received in said threaded opening of said lever;
a pre-loading device carried by said second end of said shaft, said preloading device comprising:
a pad, said pad having a first side and a second side, said first side defining a fourth friction surface said fourth friction surface convex configuration when said second friction surface has a concave configuration and a concave configuration when said second friction surface has a convex configuration;
a securing device; and,
a flexible component positioned between said pad and said securing device; and,
in the assembled configuration, said securing device forces said first friction surface against said third friction surface and said second friction surface against said fourth friction surface.

30. The device of claim 29, wherein said first friction ring is separated from said shaft by a gap of about 0.1 to about 1.0 mm.

31. The device of claim 29, wherein said second friction ring is separated from said shaft by a gap of about 0.1 to about 1.0 mm.

32. The device of claim 29, wherein said first opening is configured to receive at least a portion said first friction ring in a manner to preclude rotation of said first friction ring and said second opening is configured to receive at least a portion of said second friction ring in a manner to preclude rotation of said second friction ring.

33. The device of claim 29, wherein said collar is integral with said shaft.

34. The device of claim 29, wherein said first passageway has a central axis and said shaft is rotatable about said central axis.

35. The device of claim 29, wherein said first friction surface has a concave configuration, said second friction surface has a concave configuration, said third friction surface has a convex configuration and said fourth friction surface has a convex configuration.

36. The device of claim 35, wherein when said first friction surface has a convex configuration, said second friction surface has a convex configuration, said third friction surface has a concave configuration and said fourth friction surface has a concave configuration and wherein a radius of an arc defined by said first and second concave friction surfaces is larger than a radius of an arc defined by said third and fourth convex friction surfaces.

37. The device of claim 35, wherein when said first friction surface has a convex configuration, said second friction surface has a convex configuration, said third friction surface has a concave configuration and said fourth friction surface has a concave configuration and wherein a radius of an arc defined by said first and second concave friction surfaces is between 1.01 and 1.3 times a radius of an arc defined by said third and fourth convex friction surfaces.

38. The device of claim 29, wherein when said first friction surface has a convex configuration, said second friction surface has a convex configuration, said third friction surface has a concave configuration and said fourth friction surface has a concave configuration.

39. The device of claim 29, wherein when said first friction surface has a concave configuration, said second friction surface has a concave configuration, said third friction surface has a convex configuration and said fourth friction surface has a convex configuration.

40. The device of claim 29, wherein said first friction surface has a relatively flat surface, said second friction surface has a relatively flat surface, said third friction surface has a has a relatively flat surface and said fourth friction surface has a has a relatively flat surface.

41. The device of claim 40, wherein said first friction surface defines an angle between about 45° to about 90° with said shaft and wherein said second friction surface defines an angle between about 45° to about 90° with said shaft.

42. The device of claim 40, wherein said third friction surface defines a complementary angle with said first friction surface and said fourth friction surface defines a complementary angle with said second friction surface.

43. The device of claim 29, wherein said pre-loading device includes an adjustable fastener.

44. A device configured to create a force sensation in an aircraft flight control system, said device comprising:
- a frame configured to be secured to an aircraft mount, said frame having a first passageway extending from a first opening in a first side to a second opening in a second side and a second passageway extending from a third opening in a third side to a fourth opening in a fourth side;
- a first friction ring, at least a portion of said first friction ring positioned in said first opening, said friction ring having a first friction surface;
- a second friction ring, at least a portion of said second friction ring positioned in said second opening, said second friction ring having a second friction surface;
- a shaft rotatably secured within said frame around an axis of rotation, said shaft comprising:
  - a first end;
  - a second end;
  - a central portion located between said first end and said second end;
  - a borehole passing through said central portion of said shaft;
- said central portion of said shaft positioned within said first passageway of said frame;
- a collar carried by said first end of said shaft, said collar having a first side and a second side, said second side of said collar defining a third friction surface;
- a lever, said lever having a first end and a second end, said second end having a threaded opening, said second end of said lever passing through said third opening and secured to said central portion of said shaft by a threaded device passing through said fourth opening and said borehole of said central portion of said shaft, said threaded device received in said threaded opening of said lever;
- a pre-loading device carried by said second end of said shaft, said preloading device comprising a pad, said pad having a first side and a second side, said first side of said pad defining a fourth friction surface;
- in the assembled configuration, said pre-loading device forces said first friction surface against said third friction surface and said second friction surface against said fourth friction surface; and
- wherein said first and second friction surfaces are spherical and said third and fourth friction surfaces are toroidal.

45. The device of claim 44, wherein said first friction ring is separated from said shaft by a gap of about 0.1 to about 1.0 mm.

46. The device of claim 44, wherein said second friction ring is separated from said shaft by a gap of about 0.1 to about 1.0 mm.

47. The device of claim 44, wherein said first opening is configured to receive at least a portion said first friction ring in a manner to preclude rotation of said first friction ring and said second opening is configured to receive at least a portion of said second friction ring in a manner to preclude rotation of said second friction ring.

48. The device of claim 44, wherein said collar is integral with said shaft.

49. The device of claim 44, wherein said first passageway has a central axis and said shaft is rotatable about said central axis.

50. The device of claim 44, wherein said first spherical friction surface has a concave configuration, said second spherical friction surface has a concave configuration, said third toroidal friction surface has a convex configuration and said fourth toroidal friction surface has a convex configuration.

51. The device of claim 50, wherein a radius of an arc defined by said first and second concave friction surfaces is larger than a radius of an arc defined by said third and fourth convex friction surfaces.

52. The device of claim 50, wherein a radius of an arc defined by said first and second concave friction surfaces is between 1.01 and 1.3 times a radius of an arc defined by said third and fourth convex friction surfaces.

53. The device of claim 44, wherein said first friction surface has a convex configuration, said second friction surface has a convex configuration, said third friction surface has a concave configuration and said fourth friction surface has a concave configuration.

54. The device of claim 44, wherein said first friction surface has a relatively flat surface, said second friction surface has a relatively flat surface, said third friction surface has a has a relatively flat surface and said fourth friction surface has a has a relatively flat surface.

55. The device of claim 54, wherein said first friction surface defines an angle between about 45° to about 90° with said shaft and wherein said second friction surface defines an angle between about 45° to about 90° with said shaft.

56. The device of claim 55, wherein said third friction surface defines a complementary angle with said first friction surface and said fourth friction surface defines a complementary angle with said second friction surface.

57. The device of claim 44, wherein said pre-loading device includes an adjustable fastener.

58. The device of claim 44, wherein said pre-loading device further comprises an elastic or deformable member positioned between a pad and a washer.

59. The device of claim 44, wherein said pre-loading device further comprises an elastic bellows.

60. The device of claim 59, wherein said elastic bellows is secured to both a pad and a washer such that said pad rotates about an axis of rotation only in conjunction with said shaft.

61. The device of claim 44, wherein said pre-loading device further comprises a metallic bellows.

62. The device of claim 61, wherein said metallic bellows is secured to both a pad and a washer such that said pad rotates about an axis of rotation only in conjunction with said shaft.

* * * * *